(12) United States Patent
Brennan et al.

(10) Patent No.: US 11,787,356 B2
(45) Date of Patent: Oct. 17, 2023

(54) METHOD OF WIRELESSLY POWERING AND CONTROLLING A DIMMABLE DEVICE

(71) Applicant: Gentex Corporation, Zeeland, MI (US)

(72) Inventors: Drew D. Brennan, Holland, MI (US); Robert R. Turnbull, Holland, MI (US); John B. Ostreko, Hudsonville, MI (US); Douglas C. Papay, Zeeland, MI (US); Brian S. Lorence, Washington, MI (US); Danny L. Minikey, Jr., Fenwick, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 18/107,655

(22) Filed: Feb. 9, 2023

(65) Prior Publication Data
US 2023/0202411 A1 Jun. 29, 2023

Related U.S. Application Data

(63) Continuation of application No. 17/674,956, filed on Feb. 18, 2022, now Pat. No. 11,584,317.
(Continued)

(51) Int. Cl.
*B60R 16/03* (2006.01)
*E06B 9/24* (2006.01)
(Continued)

(52) U.S. Cl.
CPC .............. *B60R 16/03* (2013.01); *B60J 7/0007* (2013.01); *B60J 7/106* (2013.01); *E06B 9/24* (2013.01);
(Continued)

(58) Field of Classification Search
CPC . B60R 16/03; H02J 50/90; H02J 50/05; H02J 50/10
(Continued)

(56) References Cited

U.S. PATENT DOCUMENTS 5,805,330 A 9/1998 Byker et al.
5,940,201 A 8/1999 Ash et al.
(Continued)

FOREIGN PATENT DOCUMENTS

CN 105871038 A 8/2016
CN 112217290 A 1/2021
(Continued)

*Primary Examiner* — Alfonso Perez Borroto
(74) *Attorney, Agent, or Firm* — Price Heneveld LLP; Brian James Brewer

(57) ABSTRACT

A window apparatus of a vehicle includes a movable panel that selectively encloses an exterior opening of the vehicle. The movable panel includes an electro-optic apparatus configured to adjust in transmittance. A wireless connection interface includes a vehicle-side coupling module and a panel-side coupling module. The vehicle-side coupling module is in connection with a support frame of the vehicle forming an opening that receives the movable panel. The vehicle-side coupling module is aligned with an interface surface of the movable panel. The wireless connection interface communicates power or electrical signals from a transmission unit of the vehicle-side coupling module to a reception module of the panel-side coupling module.

20 Claims, 14 Drawing Sheets

Related U.S. Application Data

(60) Provisional application No. 63/151,238, filed on Feb. 19, 2021.

(51) Int. Cl.
   *B60J 7/00* (2006.01)
   *H02J 50/90* (2016.01)
   *H02J 50/05* (2016.01)
   *H02J 50/10* (2016.01)
   *B60J 7/10* (2006.01)

(52) U.S. Cl.
   CPC ............ *H02J 50/05* (2016.02); *H02J 50/10* (2016.02); *H02J 50/90* (2016.02); *E06B 2009/2464* (2013.01)

(58) Field of Classification Search
   USPC ........................................................ 307/149
   See application file for complete search history.

(56) References Cited

U.S. PATENT DOCUMENTS

| | | | |
|---|---|---|---|
| 6,137,620 A | 10/2000 | Guarr et al. | |
| 6,239,898 B1 | 5/2001 | Byker et al. | |
| 6,407,847 B1 | 6/2002 | Poll et al. | |
| 6,433,914 B1 | 8/2002 | Lomprey et al. | |
| 6,567,708 B1 | 5/2003 | Bechtel et al. | |
| 6,597,489 B1 | 7/2003 | Guarr et al. | |
| 7,085,609 B2 | 8/2006 | Bechtel et al. | |
| 7,372,611 B2 | 5/2008 | Tonar et al. | |
| 8,547,624 B2 | 10/2013 | Ash et al. | |
| 9,964,828 B2 | 5/2018 | Theiste et al. | |
| 11,584,317 B2* | 2/2023 | Brennan | E06B 9/24 |
| 2015/0303699 A1* | 10/2015 | Wagman | H02J 50/70 307/104 |
| 2016/0006288 A1* | 1/2016 | Wagman | H02J 50/10 307/104 |
| 2016/0064137 A1* | 3/2016 | Perez | H04B 5/0081 29/605 |
| 2017/0163092 A1 | 6/2017 | Graham | |

FOREIGN PATENT DOCUMENTS

| | | |
|---|---|---|
| JP | S63150927 U | 10/1988 |
| KR | 20180012113 A | 2/2018 |
| WO | 2020084448 A1 | 4/2020 |

* cited by examiner

METHOD OF WIRELESSLY POWERING AND CONTROLLING A DIMMABLE DEVICE

CROSS-REFERENCE TO RELATED APPLICATIONS

This application is a continuation of U.S. patent application Ser. No. 17/674,956 entitled METHOD OF WIRELESSLY POWERING AND CONTROLLING A DIMMABLE DEVICE, filed Feb. 18, 2022, now U.S. Pat. No. 11,584,317, which claims priority under 35 U.S.C. § 119(e) and the benefit of U.S. Provisional Application No. 63/151,238 entitled METHOD OF WIRELESSLY POWERING AND CONTROLLING A DIMMABLE DEVICE, filed on Feb. 19, 2021, by Brennan et al., the entire disclosures of which are incorporated herein by reference.

TECHNOLOGICAL FIELD

The present disclosure relates generally to an electrical connection interface for a vehicle and, more particularly, relates to a connection interface for selectively coupling a movable panel comprising an electro-optic device.

SUMMARY OF THE INVENTION

In one aspect of the invention, a window apparatus of a vehicle includes a movable panel that selectively encloses an exterior opening of the vehicle. The movable panel comprises an electro-optic apparatus formed within the movable panel. The electro-optic apparatus is configured to adjust in transmittance. A wireless connection interface comprises a vehicle-side coupling module and a panel-side coupling module. The vehicle-side coupling module is in connection with a support frame of the vehicle forming an opening that receives the movable panel. The vehicle-side coupling module is aligned with an interface surface of the movable panel. The wireless connection interface communicates power or electrical signals from a transmission unit of the vehicle-side coupling module to a reception module of the panel-side coupling module.

In another aspect, a method for controlling a dimmable window element for a vehicle includes adjusting a position of a movable panel in connection with and enclosing an exterior opening of the vehicle. The method further comprises positioning a panel module of a connection interface disposed on the movable in alignment with a vehicle module of the connection interface based on the adjustment of the position. The connection interface is disposed proximate to a frame portion of the vehicle that forms the exterior opening. At least one of a control signal and power for the dimmable window is wirelessly communicated via the connection interface. A transmittance of at least a portion of the movable panel is adjusted based on the control signal or the power.

In yet another aspect, a window apparatus of a vehicle may include a movable panel that selectively encloses an exterior opening formed by a frame or panel of the vehicle. A window comprises an electro-optic apparatus formed within the movable panel. The electro-optic apparatus is configured to adjust a transmittance of the window. A wireless connection interface comprises a first communication module in connection with an interface surface of the movable and a second communication module in connection with the frame or panel of the vehicle, wherein the connection interface is disposed in between the movable and a header of the vehicle in a closed or latched configuration.

These and other features, advantages, and objects of the present device will be further understood and appreciated by those skilled in the art upon studying the following specification, claims, and appended drawings.

BRIEF DESCRIPTION OF THE DRAWINGS

The invention will now be described with reference to the following drawings, in which.

DETAILED DESCRIPTION OF EMBODIMENTS

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 1A:
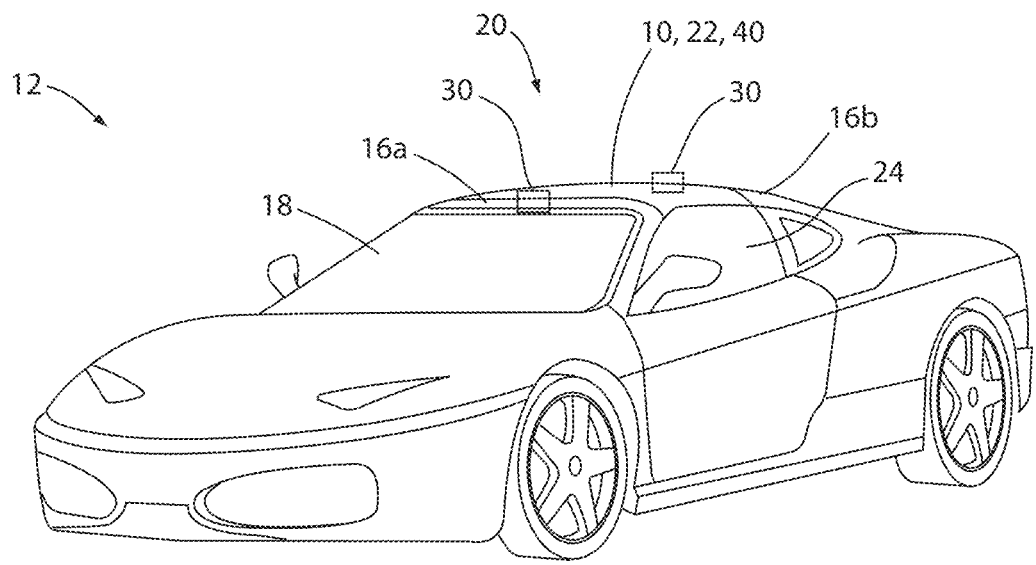
FIG. 1A is a projected view of a vehicle comprising a detachable roof panel demonstrated in a connected configuration.
Figure 1B:
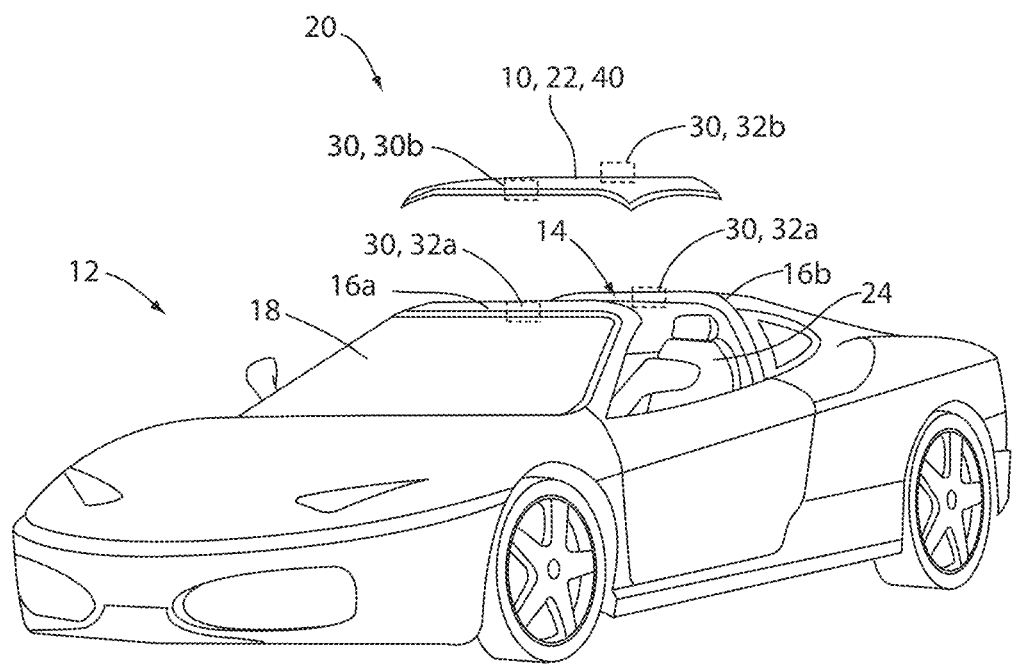
FIG. 1B is a projected view of a vehicle comprising a detachable roof panel demonstrated in a removed configuration.
Figure 2:
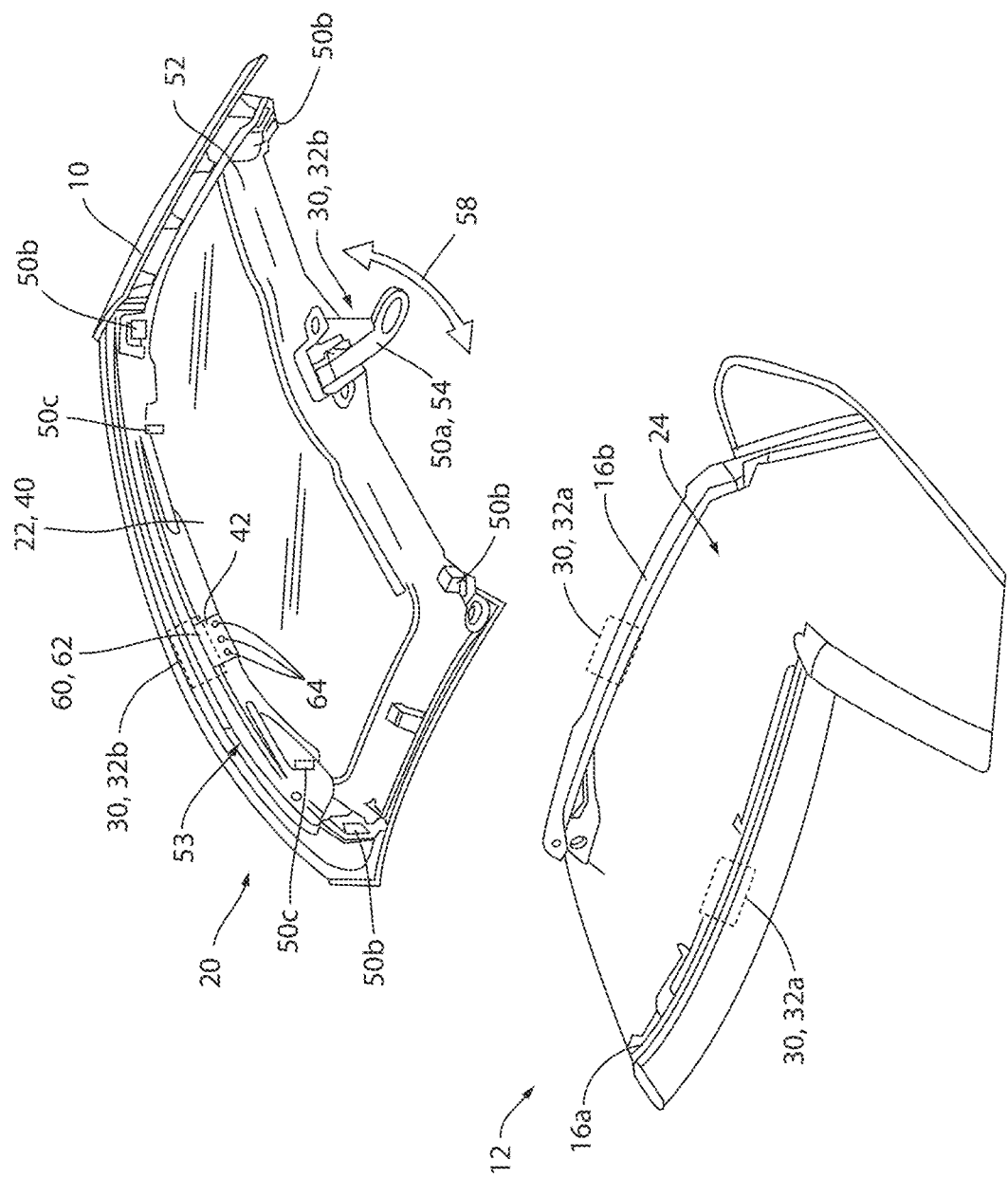
FIG. 2 is a partial exploded assembly view of the removable roof panel and an opening formed between a front and rear header of the vehicle.

Referring to FIGS. 1A, 1B, and 2, a removable body panel or roof panel 10 is shown in an installed configuration (FIG. 1A) and a removed configuration (FIGS. 1B and 2) in relation to a vehicle 12. As depicted in the exemplary illustrations, the roof panel 10 embodies a removable top designed to be installed into an opening 14 of the vehicle 12. The opening 14 is formed between a front header 16a adjacent a windshield 18 and a rear header 16b. The roof panel 10 forms a portion of a modular roof assembly 20 and includes a variable transmitting panel or window panel 22 that varies in transmittance to adjust the light entering a passenger compartment 24 of the vehicle 12. In order to maintain control of the operation of the variable transmittance of the window panel 22, a connection interface 30 communicatively connects or wirelessly couples a first terminal 32a in connection with the vehicle 12 to a second terminal 32b in connection with the roof panel 10. In various implementations, the disclosure provides for the connection interface 30 to electrically couple an electro-optic element 40 of the roof panel 10 to the vehicle electrical system or a controller configured to control the transmittance of the window panel 22. In this way, the disclosure provides for a consistent and robust electrical interface allowing the window control module 42 to adjust the transmittance of the window panel 22 by controlling the transmittance of the electro-optic element 40.

As shown in FIG. 2, the roof panel 10 of the modular roof assembly 20 is located on the front header 16a and the rear header 16b via a plurality of locating features 50. The locating features may include one or more compression levers 50a, latches 50b, locating pins 50c, and various features configured to align the roof panel 10 within the opening 14 and secure the roof panel 10 to the headers 16a, 16b of the vehicle 12. The locating features may be mechanically attached to a frame 52, which may extend around a perimeter 53 of the roof panel 10. As shown, the locating features 50 are mounted to the frame 52 in complementary locations corresponding to the positions of the roof panel 10 aligned within the opening 14 formed by the headers 16a, 16b. In this configuration, the window panel 22 comprising the electro-optic element 40 is structurally supported by the frame 52 and mounted to the body of the vehicle 12.

In the illustrated example, the compression lever 50a comprises a lever arm 54 configured to compressively latch the roof panel 10 to the rear header 16b and includes a plurality of the interlocking latches 50b positioned in corner portions of the roof panel 10 aligned with corresponding interlocking latches 50b connected to the front header 16a. The mating components of the latches 50b may include complementary features (e.g., draw bars, hooks, etc.) for mechanical connection. Additionally, or alternatively, one or more of the locating pins 50c may serve to align the roof panel 10, such that the compression lever 50a and latches 50b are positioned to secure the roof panel 10 to the vehicle in response to a rotation 58 of the lever arm 54. Accordingly, the roof assembly 20 may easily be connected and disconnected from the vehicle 12.

Various components or assemblies of the connection interface 30 may be incorporated in or advantageously utilize the mating interaction or positioning of the locating features 50 to align and/or wirelessly couple the terminals 32a and 32b of the connection interface 30. For example, in some implementations, the connection interface 30 may be incorporated in a portion of one or more of the locating features 50 and provide an electrical coupling between the window control module 42 and the vehicle electrical system based on an alignment or connection attributed to the locking of the locating feature 50. In this way, the connection interface 30 may provide for an electrical coupling between the window control module 42 incorporated in the roof panel 10 and the vehicle electrical system disposed in the vehicle 12 via the structural connection between the roof panel 10 and the vehicle 12 without requiring additional connections and minimizing steps for installation.

In various implementations, the window control module 42 may be incorporated in the roof panel 10 or may be incorporated in the vehicle 12 (e.g., in a center console, center stack, panel console, etc.). As depicted in FIG. 2, in cases where the window control module 42 is incorporated in the roof panel 10, a user interface 60 may further be included in the roof panel 10. For example, an interface panel 62 comprising a plurality of user inputs 64 may be incorporated or installed in an opening formed in the frame 52 of the roof panel 10. The user inputs may include controls configured to communicate instructions to the window control module 42 to activate and/or control the transmittance of the electro-optic element 40 of the window panel 22. Accordingly, the disclosure provides for the connection interface to communicate power to supply the window control module 42 in some implementations and may also communicate control instructions to control drive circuitry for the electro-optic element 40.

Figure 3:
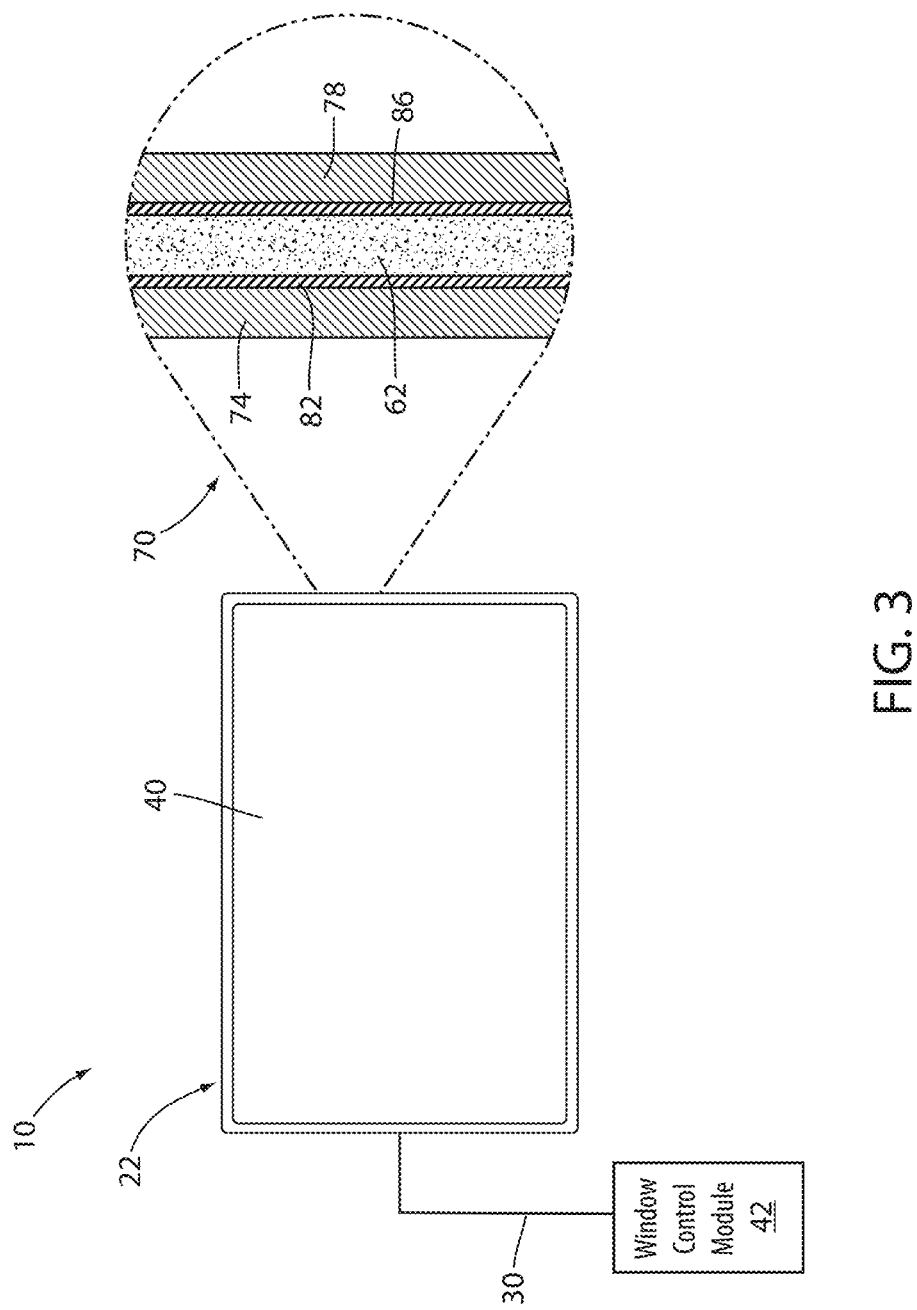
FIG. 3 is a simplified schematic diagram of an electro-optic element of a window panel.

Referring to FIG. 3, a simplified, schematic diagram of the electro-optic element 40 of the window panel 22 is shown. In order to provide for control of the electro-optic element 40 from within the vehicle 12, the connection interface 30 communicatively connects the vehicle electrical system to the window control module 42. In this configuration, the window control module 42 may be operable to control a voltage, or electrical signal, supplied to each of the electro-optic element 40 or multiple electro-optic elements, which may form dimming zones of the window panel 22. By controlling signals or voltages supplied to the connection interface 30, the window control module 42 may control a variable transmittance through an electro-optic medium 62 of the electro-optic element 40.

As demonstrated in FIG. 3, a detailed cross-section 70 of the window panel 22 is shown demonstrating a stacked structure of an exemplary configuration. The window panel 22 may include a first substrate 74 oriented to a second substrate 78 in a spaced-apart configuration. The electro-optic medium 62 (e.g., electrochromic material) may be enclosed between the first substrate 74 and the second substrate 78. A first transparent electrode 82 may be disposed between the first substrate 74 and the electro-optic medium 62, and a second transparent electrode 86 may be disposed between the second substrate 78 and the electro-optic medium 62.

The electro-optic element 40 and the first and second substrates 74, 78 may be formed of various materials. For example, the first and second substrates 74, 78 may include plastic materials. Plastic materials for the first and second substrates 74, 78 may include, but are not limited to, a clear polycarbonate, polyethylene terephthalate (PET), polyamide, acrylic, cyclic olefin, polyethylene (PEN), metallocene polyethylene (mPE), silicone, urethane, and various polymeric materials. The first and second substrates 74, 78 may also be of various forms of glass, including, but not limited to, soda lime float glass, borosilicate glass, boroaluminosilicate glass, or various other compositions. When using glass substrates, the first and second substrates 74, 78 can be annealed, heat strengthened, chemically strengthened, partially tempered, or fully tempered. The electro-optic element 40 forming the window panel 22 may be supported by the frame, which may correspond to a partial or full frame that may be used to support the window panel 22 as desired.

The first and second substrates 74, 78, as well as one or more protective layers, may be adhered together by one or more cross-linked materials. For example, the cross-linked material may correspond to at least one of the following materials: polyvinyl butyral (PVB), ethylene-vinyl acetate (EVA), thermoset EVA ethylene-vinyl acetate (EVA), and thermoplastic polyurethane (TPU). The specific materials are described in the disclosure and may correspond to exemplary materials that may be employed as heavily cross-linked materials to adhere to one or more of the first and second substrates 74, 78 and/or additional protective layers or coating. Accordingly, the specific examples described herein are to be considered non-limiting examples.

According to various aspects, the electro-optic element 40 may include memory chemistry configured to retain a state of transmittance when the vehicle 12 and the window control module 42 are inactive (e.g., not actively supplied energy from a power supply of the vehicle 12). That is, the electro-optic element 40 may be implemented as an electrochromic device having a persistent color memory configured to provide a current during clearing for a substantial time period after being charged. An example of such a device is discussed in U.S. Pat. No. 9,964,828 entitled "ELECTROCHEMICAL ENERGY STORAGE DEVICES," the disclosure of which is incorporated herein by reference in its entirety.

The electro-optic element 40 may correspond to an electrochromic device being configured to vary the transmittance of the window panel 22 discussed herein in response to an applied voltage from the window control module 42. Examples of control circuits and related devices that may be configured to provide for electrodes and hardware configured to control the electro-optic element 40 are generally described in commonly assigned U.S. Pat. No. 8,547,624 entitled "VARIABLE TRANSMISSION WINDOW SYSTEM," U.S. Pat. No. 6,407,847 entitled "ELECTROCHROMIC MEDIUM HAVING A COLOR STABILITY," U.S. Pat. No. 6,239,898 entitled "ELECTROCHROMIC STRUCTURES," U.S. Pat. No. 6,597,489 entitled "ELECTRODE DESIGN FOR ELECTROCHROMIC DEVICES," and U.S. Pat. No. 5,805,330 entitled "ELECTRO-OPTIC WINDOW INCORPORATING A DISCRETE PHOTOVOLTAIC DEVICE," the entire disclosures of each of which are incorporated herein by reference. Examples of electrochromic devices that may be used in windows are described in U.S. Pat. No. 6,433,914 entitled "COLOR-STABILIZED ELECTROCHROMIC DEVICES," U.S. Pat. No. 6,137,620 entitled "ELECTROCHROMIC MEDIA WITH CONCENTRATION-ENHANCED STABILITY, PROCESS FOR THE PREPARATION THEREOF AND USE IN ELECTROCHROMIC DEVICES," U.S. Pat. No. 5,940,201 entitled "ELECTROCHROMIC MIRROR WITH TWO THIN GLASS ELEMENTS AND A GELLED ELECTROCHROMIC MEDIUM," and U.S. Pat. No. 7,372,611 entitled "VEHICULAR REARVIEW MIRROR ELEMENTS AND ASSEMBLIES INCORPORATING THESE ELEMENTS," the entire disclosures of each of which are incorporated herein by reference. Other examples of variable transmission windows and systems for controlling them are disclosed in commonly assigned U.S. Pat. No. 7,085,609, entitled "VARIABLE TRANSMISSION WINDOW CONSTRUCTIONS," and U.S. Pat. No. 6,567,708 entitled "SYSTEM TO INTERCONNECT, LINK, AND CONTROL VARIABLE TRANSMISSION WINDOWS AND VARIABLE TRANSMISSION WINDOW CONSTRUCTIONS," each of which is incorporated herein by reference in its entirety. In other embodiments, the electro-optic device may include a suspended particle device, liquid crystal, or other system that changes transmittance with the application of an electrical property.

Referring to FIGS. 4-14, various components and assemblies of the connection interface 30 are demonstrated illustrating the connection interface 30 implemented via a wireless electrical coupling or connection. Such a wireless electrical coupling may be achieved via proximate induction coils, capacitive plates, energy harvesting (e.g., capturing ambient vibrations of the vehicle 12, wind, heat, etc.), or various other methods of achieving electrical coupling between neighboring modules wirelessly. Accordingly, the connection interface 30 may be referred to as a wireless connection interface 30. In general, the wireless electrical coupling discussed in reference to the exemplary implementations is achieved by communicating electrical signals and power between adjacent coupling modules, generally referred to herein as a first coupling module 92 and a second coupling module 94. The first coupling module 92 may be in connection with a portion of the vehicle 12, for example, one of the front header 16a or the rear header 16b. The second coupling module 94 may be connected to a portion of the roof panel 10, for example a portion of the frame 52. Accordingly, the proximity of the first and second coupling modules 92, 94 may be positioned and maintained based on the alignment and secure mounting of the roof panel 10 when installed and enclosing the opening 14 of the vehicle 12.

Figure 4:
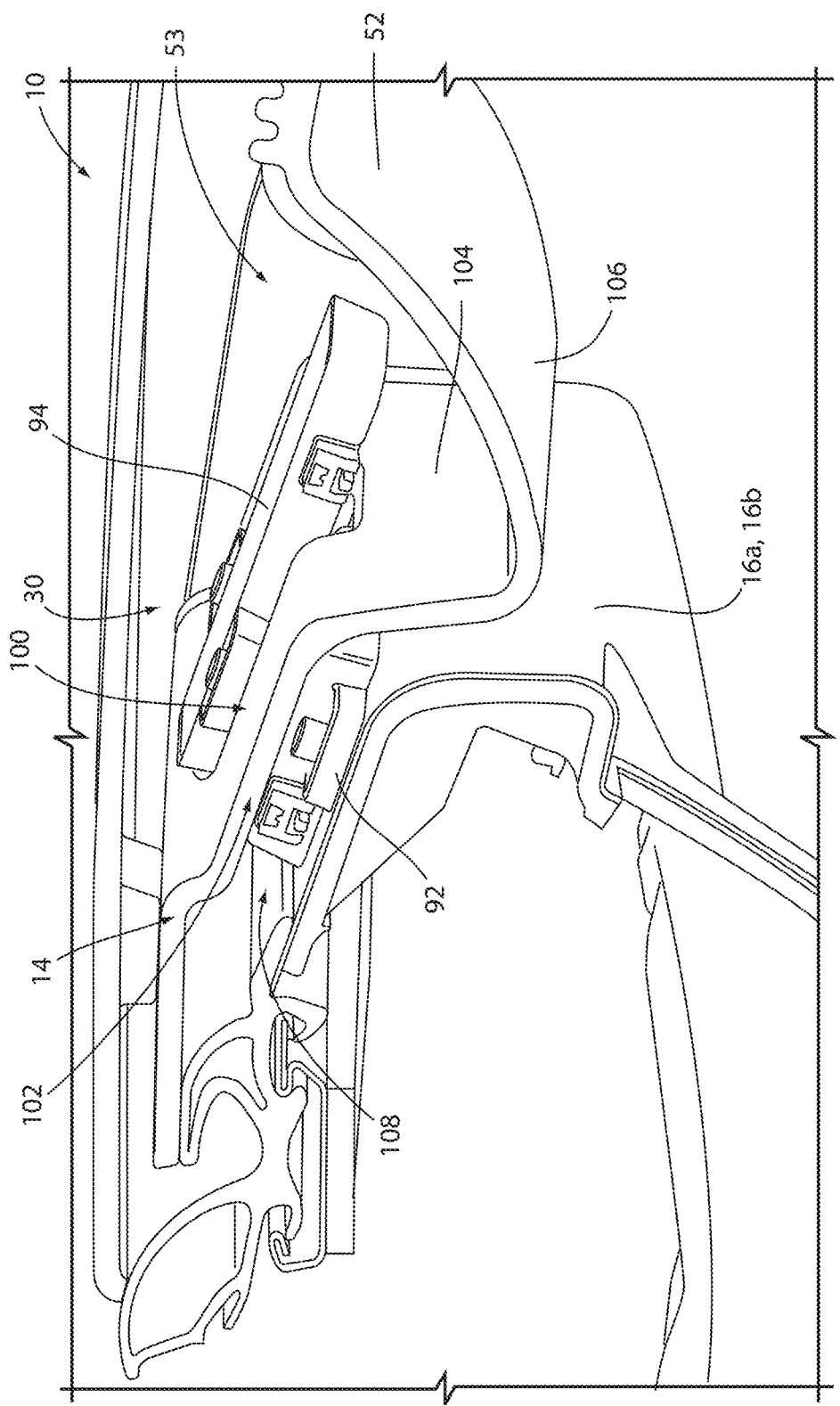
FIG. 4 is a fore-aft cross-sectional view demonstrating a modular roof assembly comprising a wireless connection interface.
Figure 5:
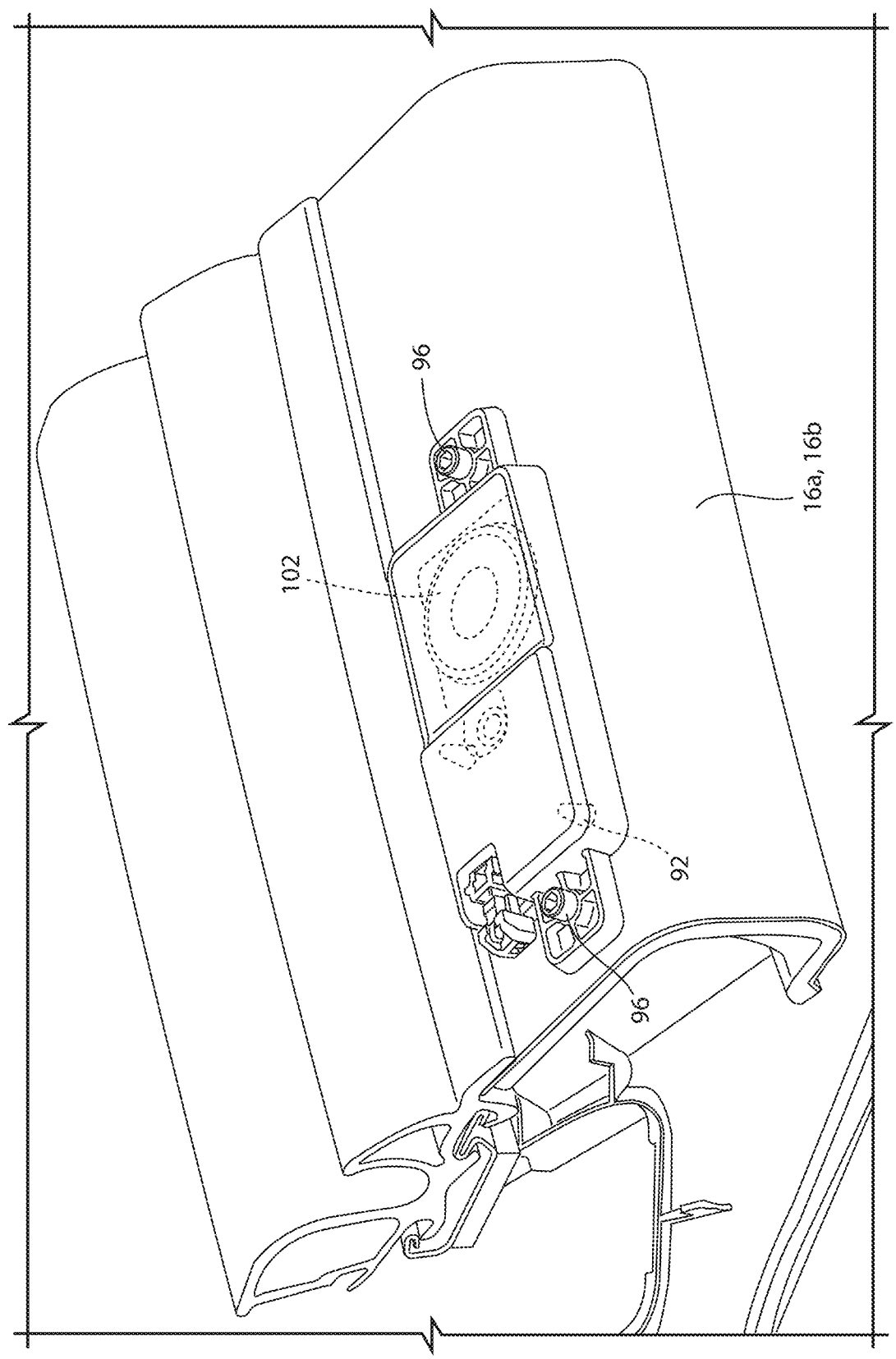
FIG. 5 is a partial view of a header of a vehicle demonstrating a first module of a wireless connection interface.
Figure 6:
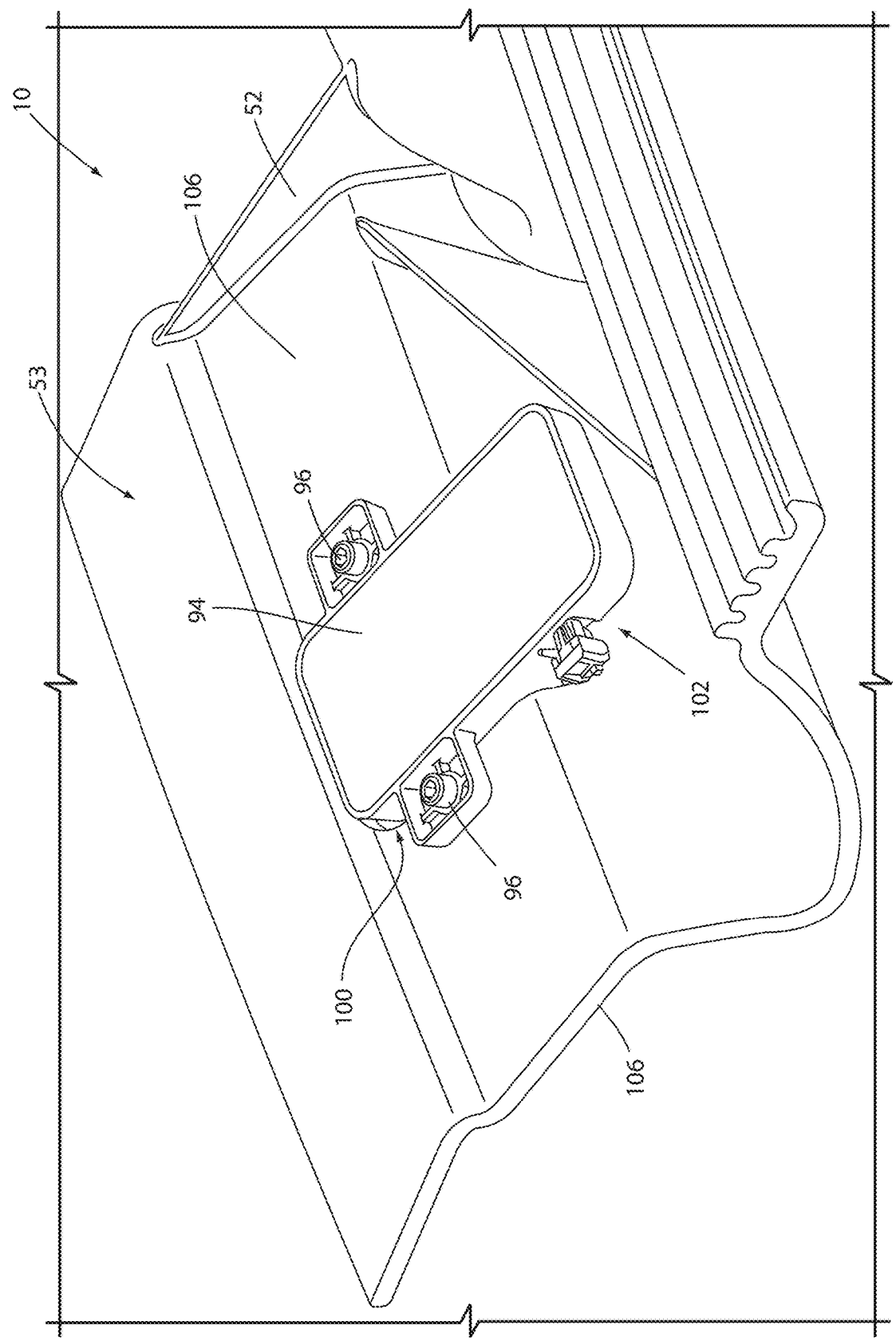
FIG. 6 is a partial section view of a frame of a roof panel of a modular roof assembly comprising a second coupling module of a wireless connection interface.
Figure 7:
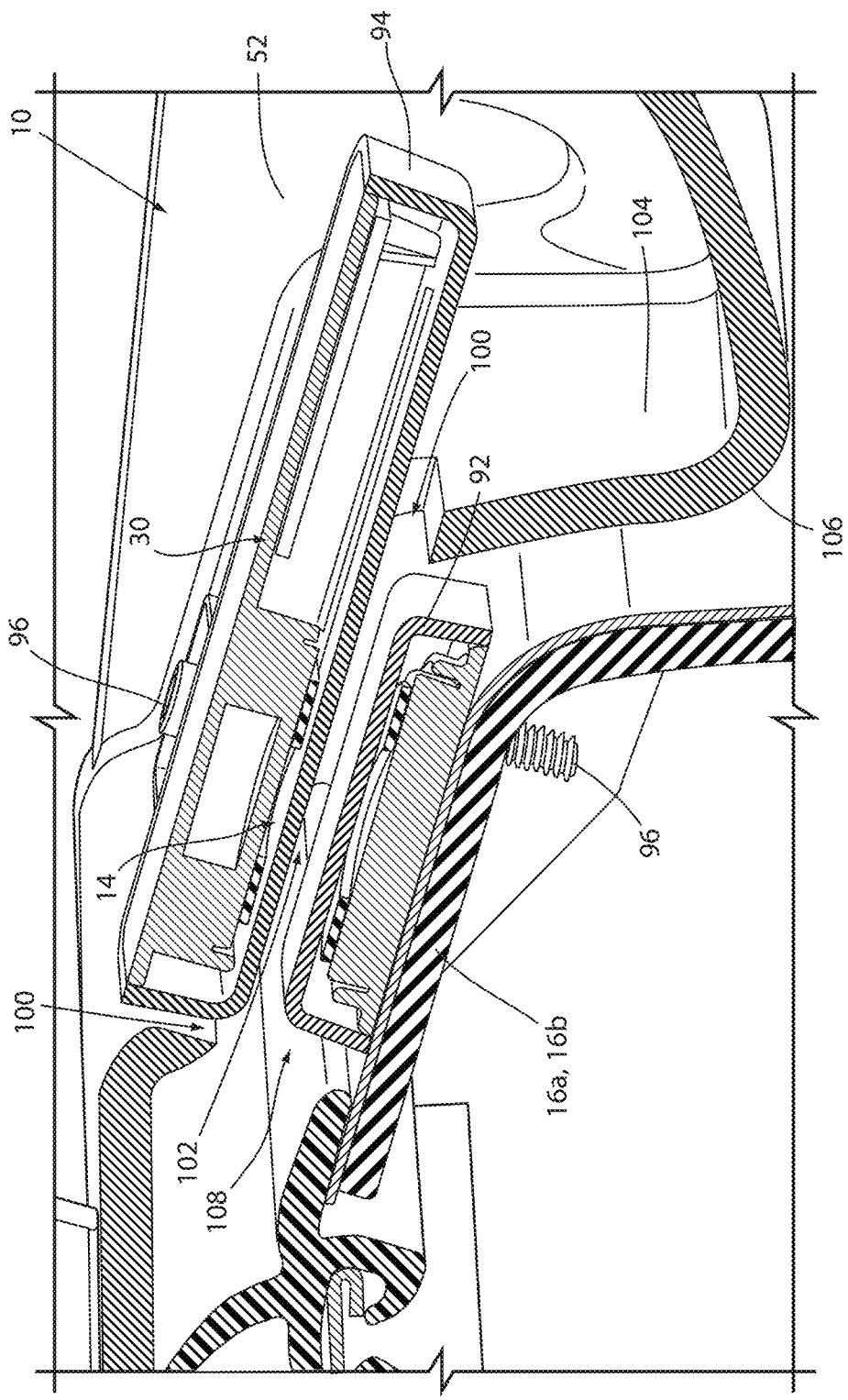
FIG. 7 is a fore-aft cross-sectional view of the first and second coupling modules of the wireless connection interface.
Figure 8:
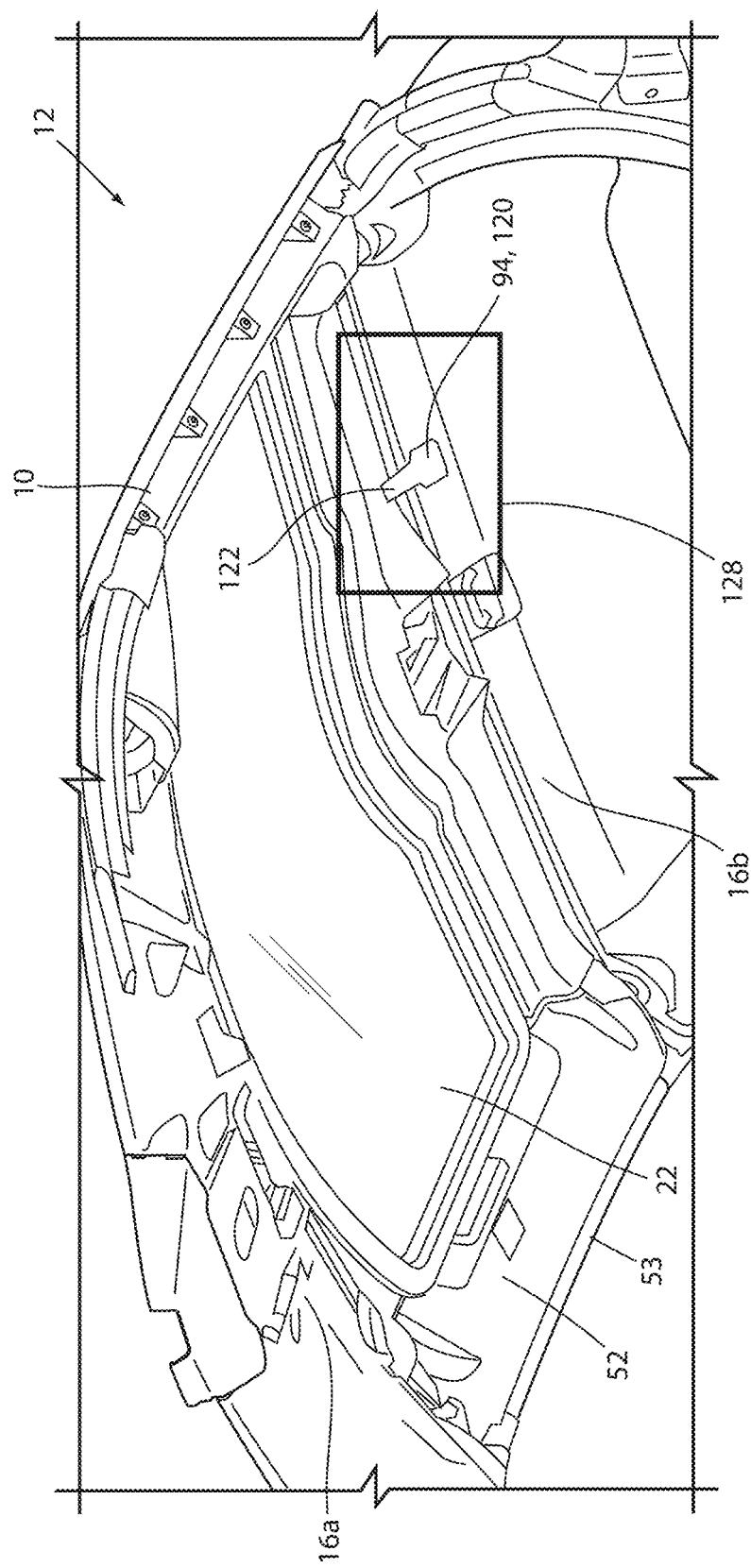
FIG. 8 is a partial assembly view demonstrating a roof of a passenger compartment comprising a wireless connection interface.
Figure 9:
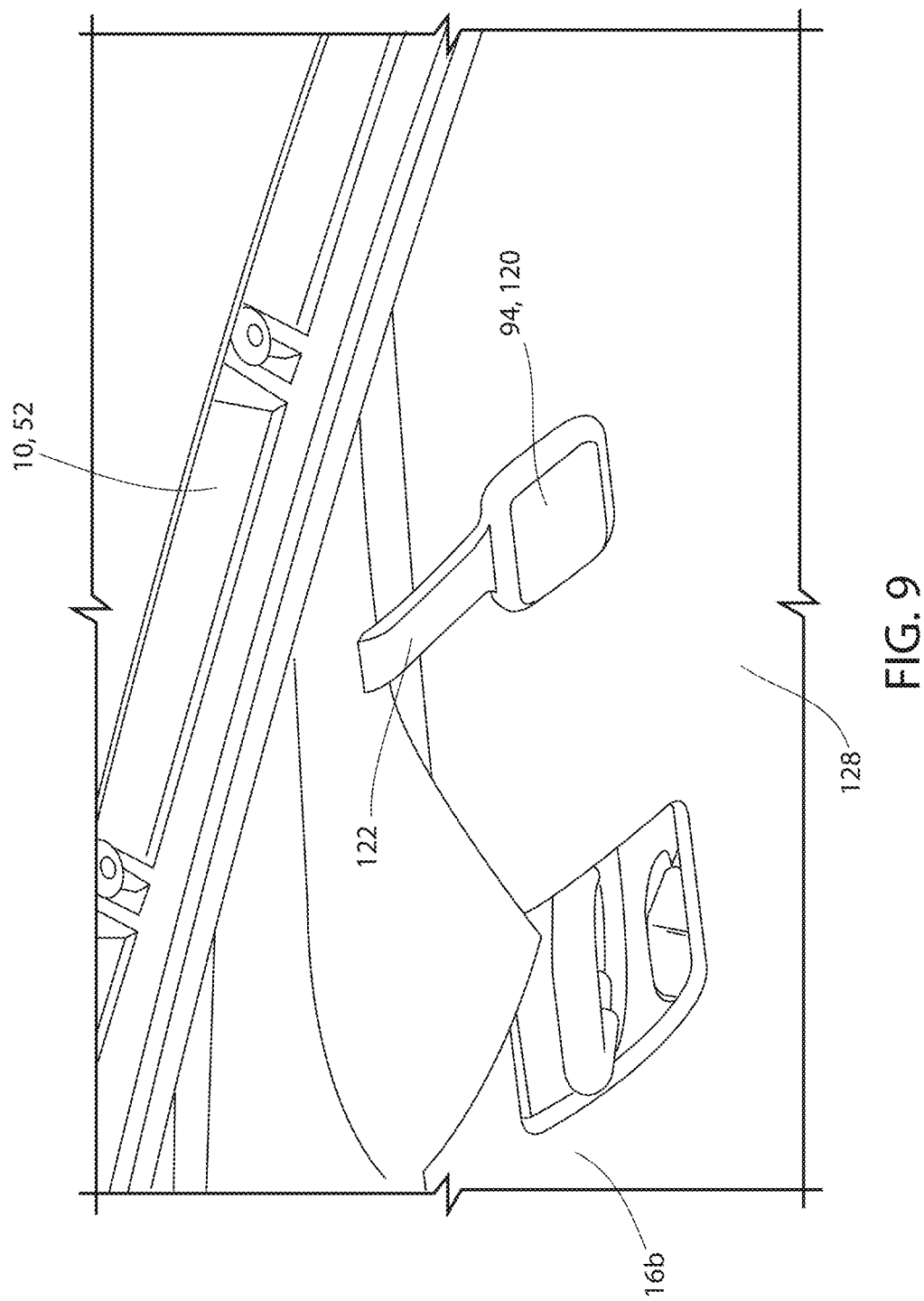
FIG. 9 is a detailed view of the wireless connection interface introduced in FIG. 8.

Referring now to FIGS. 4-8, the wireless connection interface 30 includes the first coupling module 92 secured to one of the headers 16a or 16b and the second coupling module 94 connected to a corresponding portion of the frame 52. The first coupling module 92 is mechanically connected to the header 16a or 16b via one or more fasteners 96. The second coupling module 94 is similarly affixed to the frame 52 of the roof panel 10 via the fasteners 96 and extends at least partially through a cutout or aperture 100 formed in the frame 52. As depicted in FIG. 4, the aperture 100 provides clearance for a coupling surface 102 of the second coupling module to extend from a first side 104 of the frame directed outward of the vehicle to a second side 106 directed inward toward the passenger compartment 24 of the vehicle 12. In this configuration, the coupling surface 102 of the second coupling module 94 is positioned proximate to a corresponding coupling surface 102 of the first coupling module 92. As depicted in FIG. 4, the coupling surfaces 102 of each of the coupling modules 92, 94 are aligned and positioned in close proximity in response to the installation of the roof panel 10 enclosing the opening 14 of the vehicle 12. As depicted, the first coupling module 92 is positioned within a gap 108 formed between the header 16a, 16b and the frame 52. In this configuration, the aligned positions of the first coupling module 92 and the second coupling module 94 provide for alignment of the wireless electrical coupling of the connection interface 30, such that control signals and/or power communicated from the control module 42 may be wirelessly transmitted to the electro-optic element 40 to control the transmittance of the window panel 22.

As discussed, the proximity or distance necessary to effectively sustain electrical communication between the first and second coupling modules 92, 94 may vary based on the technology implemented. In some implementations, the coupling modules may comprise complementary inductive coils (e.g., a transmitter coil and a receiver coil). In general, a transmitter coil (e.g., module 92) may receive an alternating current that generates an electromagnetic field proximate to the coil. When the receiver coil (e.g., 94) is aligned and positioned in proximity with the transmitter coil, the electromagnetic field communicates the electrical energy to the receiver coil, such that operating power may be communicated wirelessly between the coupling modules 92, 94 without requiring a physical conductive connection. Though inductive charging is described in more detail, other forms of wireless charging and communication including, but not limited to, capacitive and resonant wireless charging may similarly be implemented. The range or distance between the coupling modules 92, 94 is generally referred to as the coupling modules being proximate to or within close proximity of each other. Such a distance may range from approximately 0.1 mm to 40 mm and may be approximately 1 mm to 25 mm. Accordingly, the corresponding alignment features (e.g., magnets) and arrangement of the coupling modules 92, 94 may provide for the relative position of the coupling modules 92, 94 within a range of distances from approximately 0.1 mm to 40 mm in the assembled configuration, as depicted in FIG. 1A.

Referring now to FIGS. 8-11, an implementation of the connection interface 30 is shown providing the second coupling module 94 in a tethered accessory 120 flexibly connected to the roof panel 10. By incorporating the second coupling module 94 in the tethered accessory 120, the wireless electrical coupling between the first coupling module 92 and the second coupling module 94 may be adjusted independent of the exact alignment of the roof panel 10 and corresponding attachment to the vehicle 12. The tethered accessory 120 is electrically connected to the electro-optic element 40 in the window panel 22 via a flexible harness 122. Accordingly, to insure alignment between the coupling modules 92 and 94, the tethered accessory 120 may be moved or adjusted without adjusting the connection of the roof panel 10.

Figure 10:
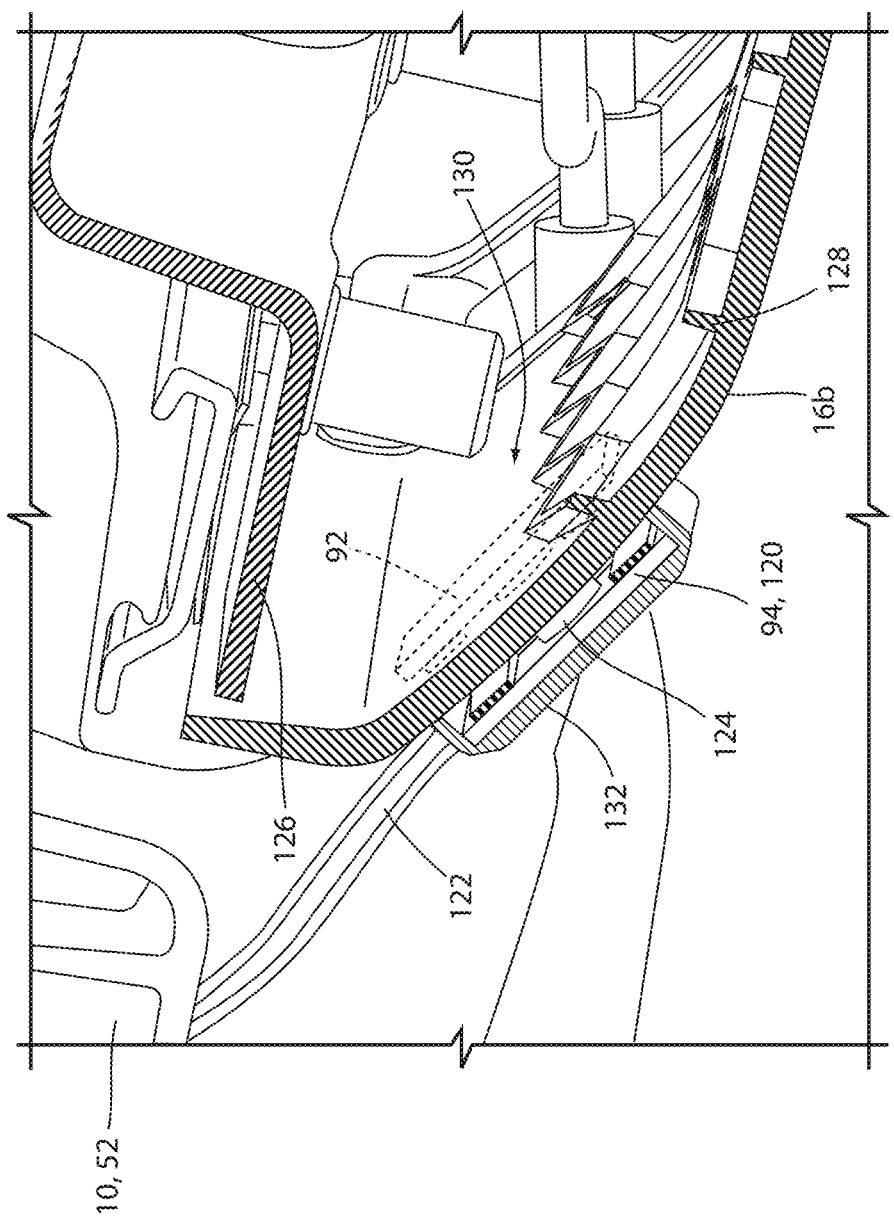
FIG. 10 is a fore-aft cross-sectional view of the wireless connection interface demonstrating first and second coupling modules as introduced in FIGS. 8 and 9.
Figure 11:
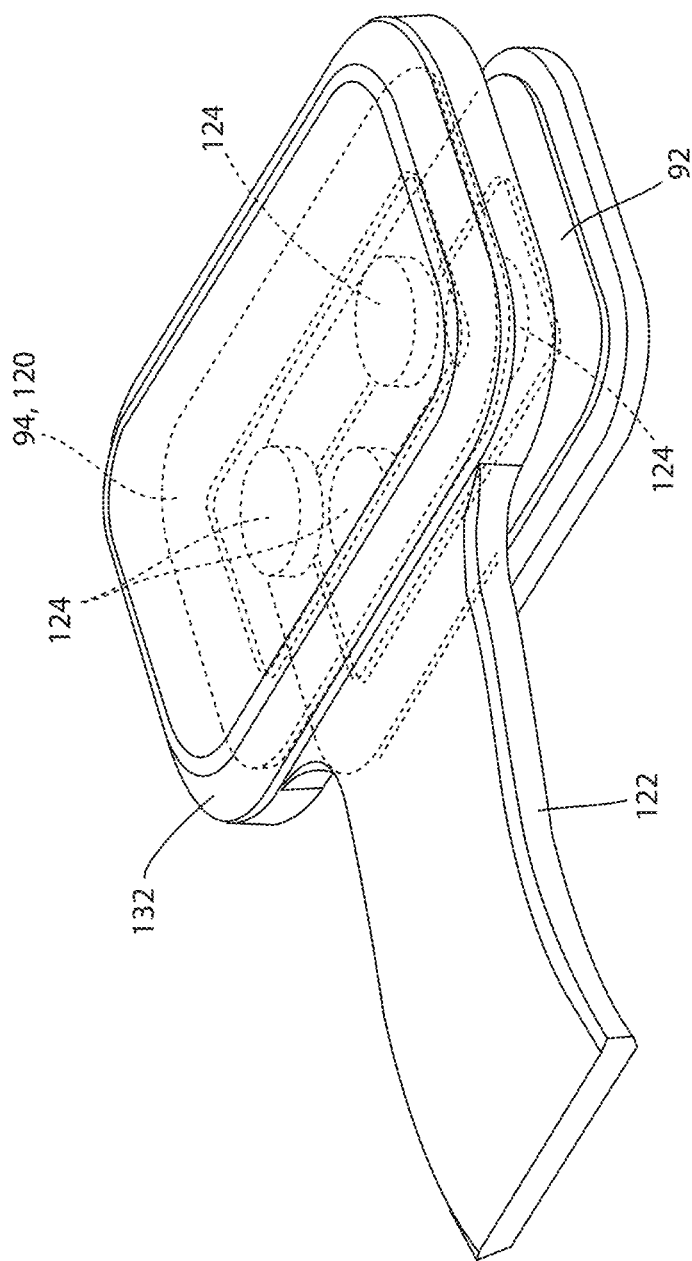
FIG. 11 is a detailed view of the first and second coupling modules of the wireless connection interface previously discussed in FIGS. 8-10.

As depicted in FIGS. 10 and 11, the first and second coupling modules 92 and 94 include a plurality of alignment magnets 124, which align the coupling modules 92, 94 and secure the tethered accessory 120 to an interior roof portion 126 or headliner 128 of the vehicle 12. As shown in FIG. 10, the first coupling module 92 is enclosed behind the headliner 128 positioned aft of the rear header 16b. Accordingly, the first coupling module 92 may be concealed behind the headliner 128 within an enclosed cavity 130 formed between the headliner 128 and the interior roof portion 126. The tethered accessory 120 may be enclosed within an overmolded shell 132 and suspended from the roof panel 10 via the flexible harness 122, such that when positioned in close proximity to the corresponding location of the first coupling module 92 on the headliner 128, the alignment magnets 124 magnetically couple the second coupling module 94 to the first coupling module 92. In this configuration, the connection interface 30 may be aligned for wireless electrical coupling. Accordingly, in cases where the window control module 42 is incorporated in the vehicle 12, the vehicle can effectively communicate electrical signals to the electro-optic element 40 in the window panel of the roof panel 10. In other implementations, where the window control module 42 is incorporated in the roof panel 10, electrical power from the vehicle 12 can be communicated to window control module to control the electro-optic element 40.

Figure 12:
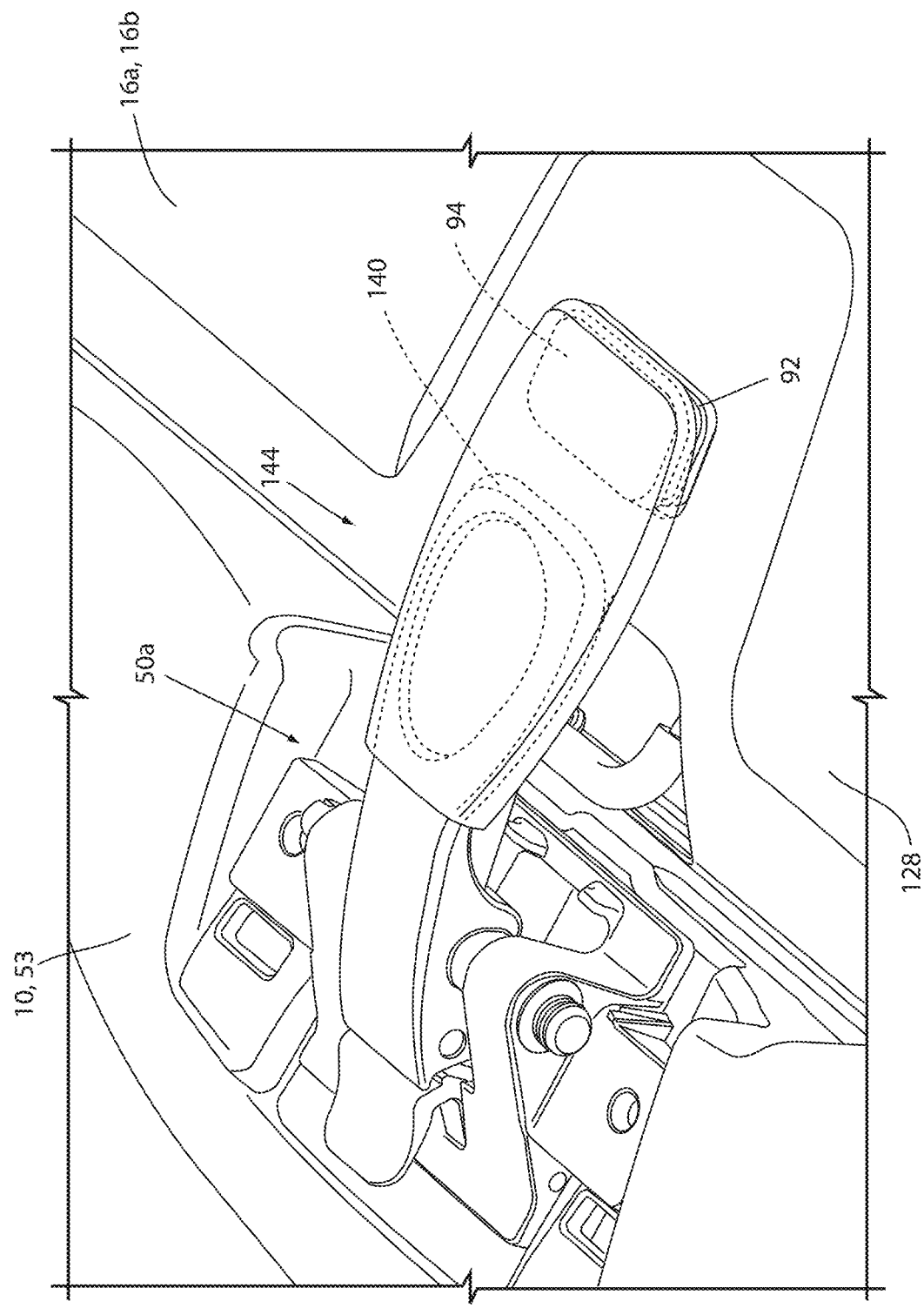
FIG. 12 is a detailed assembly view of a connection interface incorporated in a compression lever of a modular roof assembly.
Figure 13:
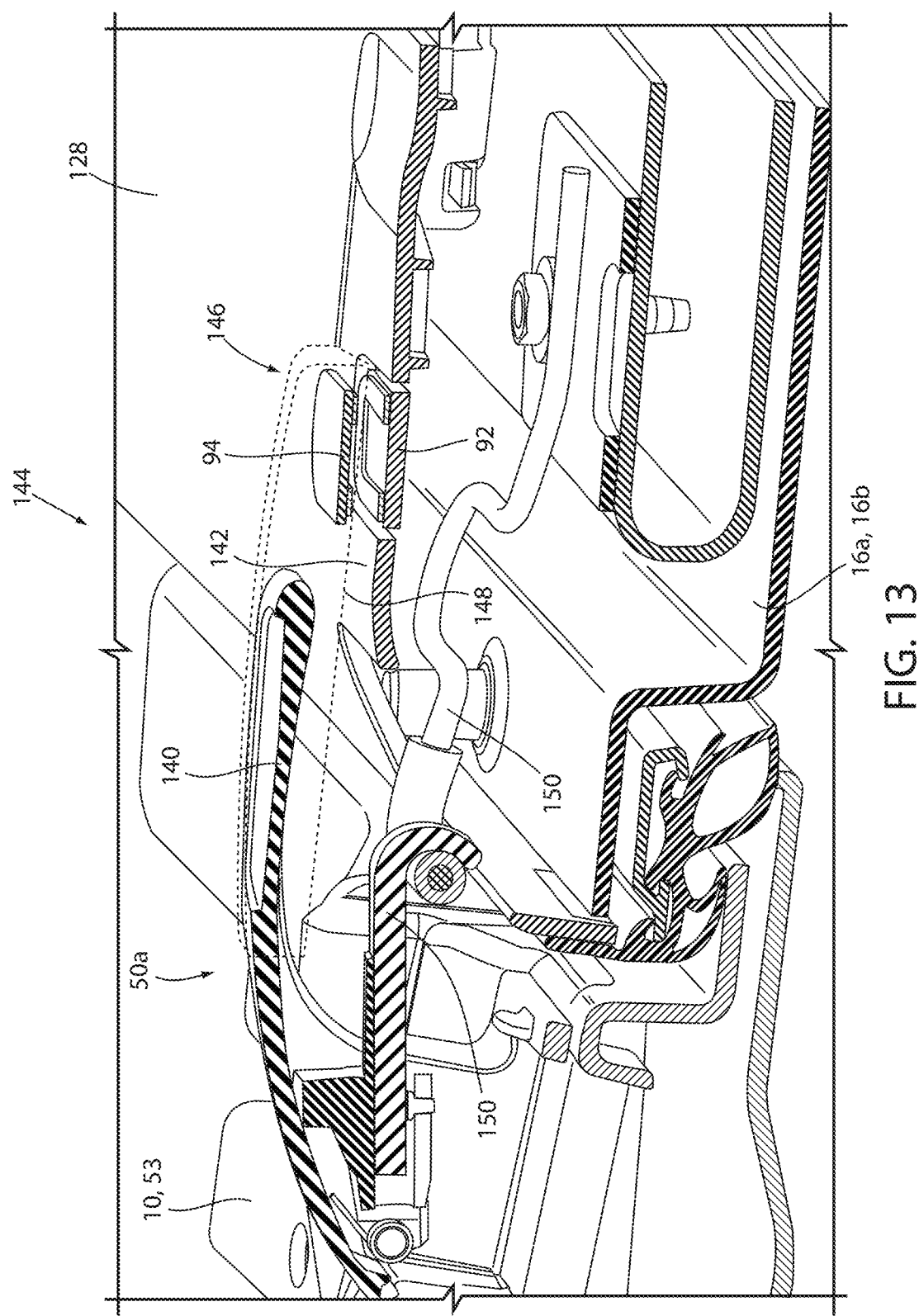
FIG. 13 is a fore-aft cross-sectional view of the wireless connection interface incorporated in the compression lever as introduced in FIG. 12.

Referring now to FIGS. 12-13, an implementation of the connection interface 30 is shown demonstrating the second coupling module 94 incorporated in a lever arm 140 of the compression lever 50a as previously discussed in reference to FIG. 2. As demonstrated, the first coupling module 92 may be in connection with an interior surface 142 of one of the headers 16a or 16b, such that the first coupling module 92 is directed outward from the header 16a or 16b and aligned with the second coupling module 94 in response to the compression lever 50a oriented in a closed or latched position 144. Accordingly, the second coupling module 94 may be incorporated in a distal portion 146 of the lever arm 140 and may be secured to a side or surface 148 of the lever arm 140 that is directed to or faces the interior surface 142 of the vehicle when the lever arm 140 is positioned in the latched position 144.

As shown in FIGS. 12-13, the latching engagement of the compression lever 50a in combination with the positioning provided by the remaining locating features 50 may provide for the roof panel 10 to be consistently aligned within the opening 14 between the front header 16a and the rear header 16b of the vehicle 12. The distal portion 146 of the lever arm 140 is consistently positioned within the vehicle in the latched position 144, such that the position of the second coupling module 94 relative to the first coupling module 92 may result inherently from the closure of the lever arm 94 in the latched position 144. Accordingly, orientation of the coupling modules 92, 94 forming the wireless connection interface 30 is provided based on the relationship of the distal portion 146 of the lever arm 140 relative to the header 16a, 16b or similarly the interior roof portion 126 or headliner 128, such that the wireless coupling between the coupling modules 92, 94 is achieved.

As depicted in the cross-sectional view of the compression lever 50a demonstrated in FIG. 13, a hook or latch 150 of the compression lever 50a may draw the roof panel 10 into a secure and compressed position against one or more seals formed on the headers 16a, 16b of the vehicle by applying tension to a draw bar 152 that is secured to the header 16a, 16b or various other structural aspects of the body of the vehicle 12. Accordingly, as demonstrated in the various implementations of the wireless connection interface 30, the modular roof assembly 20 provided by the disclosure may be implemented in a variety of ways to achieve the wireless electrical coupling of the modular roof assembly 20, such that the window control module 42 can consistently wirelessly control the electro-optic element 40 of the window panel 22.

Figure 14A:
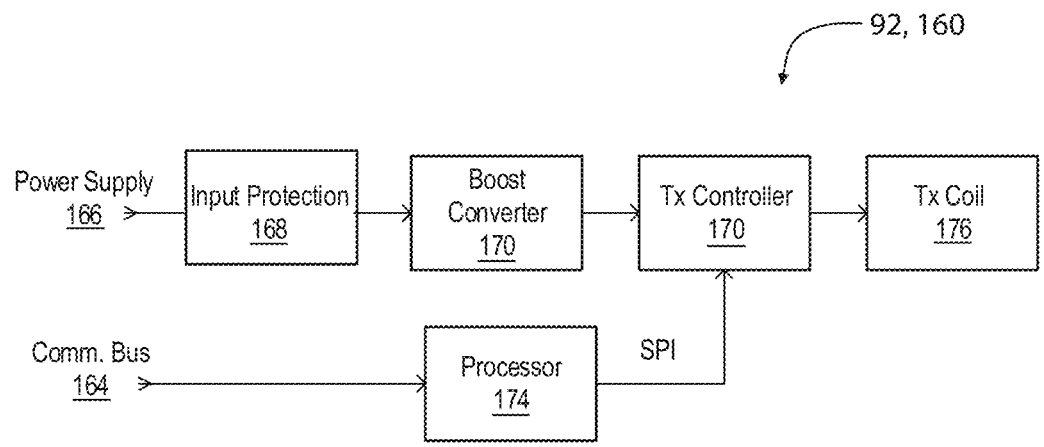
FIG. 14A is a block diagram of an exemplary transmission circuit of a wireless connection interface.
Figure 14B:
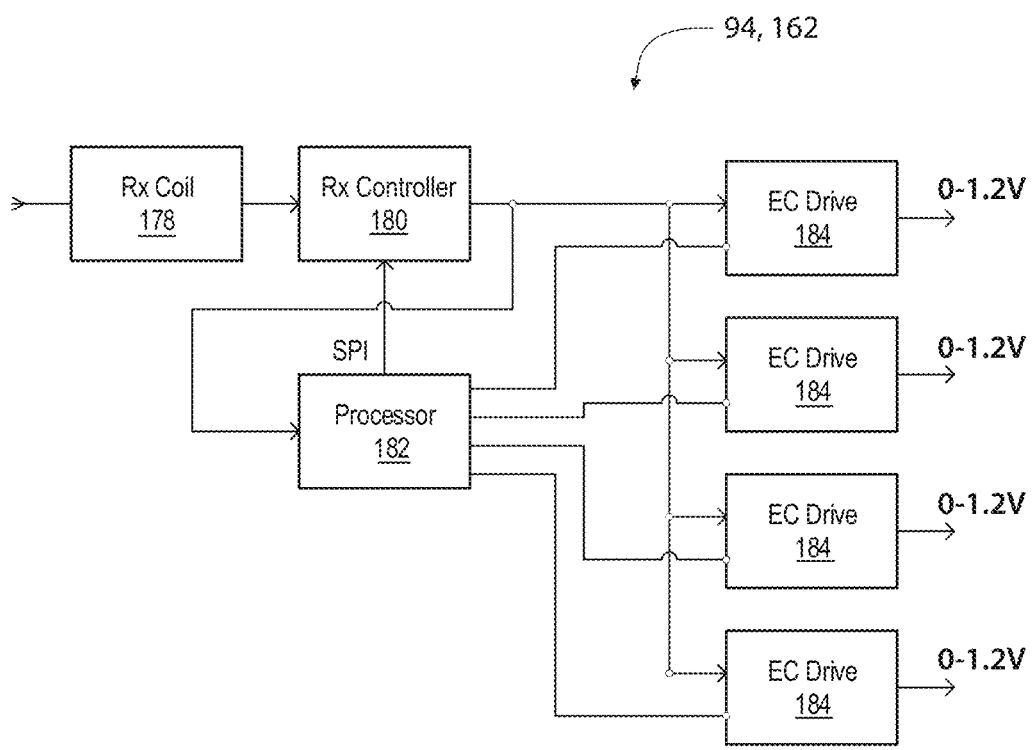
FIG. 14B is a block diagram of a receiver circuit of a wireless connection interface.

Referring now to FIGS. 14A-14B, block diagrams are shown representing exemplary circuits providing the wireless electrical coupling between the first coupling module 92 and the second coupling module 94. The first coupling module 92 is represented by the circuit demonstrated in FIG. 14A. The first coupling module 92 may correspond to a transmission module 160 configured to transmit power and control signals to the second coupling module 94, which may be implemented as a receiver module 162. In operation, control signals from the window control module 42 of the vehicle 12 may be communicated via a communication bus 164. Additionally, the transmission module 160 may receive power from the vehicle via a vehicle power supply 166. The power supply 166 from the vehicle may range from approximately 9-16 volts and may be supplied to input protection circuitry 168. The input protection circuitry 168 may prevent surges associated with the power supply 166 from damaging the circuitry of the transmission module 160. The input protection circuitry 168 may supply a conditioned and protected voltage to a power converter 170 that regulates the voltage from the power supply 166 to a stabilized voltage level (e.g., 20-30 volts). The power from the power converter 170 may be supplied to a wireless power transmitter module 172, which may be implemented by various wireless power transmission standards (e.g., Qi, PMA, etc.).

In operation, the control instructions from the window control module 42 may be communicated via the communication bus 164 to a processor 174. The processor 174 may receive and interpret the control instructions from the communication bus 164 and supply wireless control instructions to the wireless power transmitter module 172. The transmitter module 172 may then output the control instructions to a transmission coil 176 and, in turn, wireless communication may be output from the transmission coil 176 and received by a receiver coil 178 of the receiver module 162.

The receiver module 162 may conduct the control instructions detected by the receiver coil 178 to a wireless power receiver module 180. The wireless power receiver module 180 may similarly be implemented by various wireless electrical coupling standards as discussed herein. The received control instructions may then be supplied to a window control processor 182 configured to control the operation of one or more electro-optic drive circuits 184 in communication with the electro-optic element 40 or multiple electro-optic elements. In addition to the control signals supplied from the processor 182, operating power for each of the electro-optic drive circuits 184 may be supplied from the wireless power receiver module 180. In this way, the receiver module 162 may receive power and control instructions from the transmission module 160 via the wireless electrical coupling, such that the window control module 42 disposed in the vehicle 12 or the removable top can control the electro-optic element 40 disposed in the window panel 22 of the modular roof assembly 20.

According to an aspect of the present disclosure, a window apparatus of a vehicle comprises a removable panel that selectively encloses an exterior opening of the vehicle; a window comprising an electro-optic apparatus formed within the removable panel, wherein the electro-optic apparatus is configured to adjust a transmittance of the window; and a wireless connection interface in connection with an interface surface of the removable panel, wherein the wireless connection interface communicates power or electrical signals from the vehicle to the electro-optic apparatus.

According to various aspects, the disclosure may implement one or more of the following features or configurations in various combinations:
  the interface surface is aligned with a header proximate to the exterior opening of the vehicle in the assembled configuration;
  the interface surface is disposed in a cavity between the removable panel and a header of the vehicle in an assembled configuration;
  the wireless connection interface comprises a plurality of connection modules that are aligned within the cavity in the assembled configuration;
  the connection modules comprise complementary inductive coils configured to wirelessly transmit the power or electrical signals between the connection modules;
  an alignment of the connection modules electrically couple an electrical supply of the vehicle to at least one terminal of the electro-optic element in the assembled configuration of the window panel in connection with the vehicle;
  the connection modules comprise a first module and a second module, wherein the first modules is in connection with a body portion of the vehicle proximate to the header;
  the second module is incorporated is in connection with the interface surface of the removable panel;
  the second module is incorporated in a tethered accessory coupled to the removable panel via a flexible harness;
  the connection modules comprise a second module disposed in the tethered accessory is maintained in an aligned position relative to the first module via a magnetic interface;
  the wireless connection interface communicates electrical control signals and power between a plurality of induction coils or capacitive plates disposed in the connection modules;
  the second module is incorporated in a lever arm of a latch configured to retain the removable panel in connection with the header of the vehicle;
  the second module is positioned in close proximity first module electrically coupling the wireless connection interface in response to the lever arm in a latched position; and/or
  the removable panel forms an exterior roof panel of the vehicle.

According some aspects of the disclosure, a method for controlling a dimmable window element for a vehicle comprises installing a removable panel in connection with and enclosing an exterior opening of the vehicle; positioning a first module of a connection interface disposed on the removable panel in alignment with a second module of the connection interface disposed on proximate to a header portion of the vehicle based on the installation; and wirelessly communicating at least one of a control signal and a power for the dimmable window via the connection interface.

According to various aspects, the disclosure may implement one or more of the following features, steps or configurations in various combinations:
  the method further comprises aligning the first module of the connection interface with the second module by magnetically attracting the first module and the second module; and/or
  the method further comprises suspending the first module from a flexible harness, wherein the flexible harness provides for the first module to move in close proximity with the second module in response to the magnetic attraction.

According to some aspects of the disclosure, a window apparatus of a vehicle comprises a removable panel that selectively encloses an exterior opening of the vehicle; a window comprising an electro-optic apparatus formed within the removable panel, wherein the electro-optic apparatus is configured to adjust a transmittance of the window; and a wireless connection interface comprising a first connection module in connection with an interface surface of the removable panel and a second connection module in connection with the vehicle proximate to a header configured to receive the removable panel, wherein the connection interface is disposed in a cavity between the removable panel and a header of the vehicle in an assembled configuration.

According to various aspects, the disclosure may implement one or more of the following features or configurations in various combinations:

- an alignment of the first connection module with the second connection module electrically couples an electrical supply of the vehicle to at least one terminal of the electro-optic element in the assembled configuration of the window panel in connection with the vehicle; and/or
- the wireless connection interface communicates at least one of electrical control signals and power between a plurality of induction coils or capacitive plates disposed in the connection modules It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A window apparatus of a vehicle, the apparatus comprising:
    a movable panel that selectively encloses an exterior opening of the vehicle, the movable panel comprising an electro-optic apparatus formed within the movable panel, wherein the electro-optic apparatus is configured to adjust in transmittance; and
    a wireless connection interface comprising a vehicle-side coupling module and a panel-side coupling module, wherein the vehicle-side coupling module is in connection with a support frame of the vehicle forming an opening that receives the movable panel, and the vehicle-side coupling module is aligned with an interface surface of the movable panel, wherein the wireless connection interface communicates power or electrical signals from a transmission unit of the vehicle-side coupling module to a reception module of the panel-side coupling module.

2. The window apparatus according to claim 1, wherein the transmission unit of the vehicle-side coupling module is aligned with the reception module of the panel-side coupling module in coordination with the closure or latching of the movable panel in connection with the vehicle.

3. The window apparatus according to claim 1, further comprising a transmittance control module incorporated in the movable panel.

4. The window apparatus according to claim 3, wherein the transmittance control module communicates signals to control the transmittance of the electro-optic apparatus.

5. The window apparatus according to claim 3, wherein the transmittance control module is in communication with a control module of the vehicle via the wireless connection interface.

6. The window apparatus according to claim 3, wherein the transmittance control module is configured to receive control instructions from the control module of the vehicle and control the transmittance of the electro-optic apparatus responsive to the control signals.

7. The window apparatus according to claim 3, wherein the control module comprises a user interface incorporated in at least one of the movable panel and a header of the vehicle in connection with the support frame.

8. The window apparatus according to claim 1, wherein the interface surface is disposed in a cavity between the removable panel and in connection with the support frame with the movable panel in a closed configuration, wherein the closed configuration includes the movable panel closed or latched in connection with the vehicle.

9. The window apparatus according to claim 8, wherein the transmission unit of the vehicle-side coupling module and the reception module of the panel-side coupling module are aligned within the cavity in the closed configuration.

10. The window apparatus according to claim 9, wherein an alignment of the connection modules electrically couples an electrical supply of the vehicle to at least one terminal of the electro-optic element in the closed configuration.

11. The window apparatus according to claim 1, wherein at least one of the panel-side coupling module and the vehicle-side coupling module is incorporated in a tethered accessory coupled to the vehicle or the removable panel via a flexible harness.

12. The window apparatus according to claim 1, wherein the wireless connection interface communicates electrical control signals and power between a plurality of induction coils or capacitive plates disposed in the panel-side coupling module and the vehicle-side coupling module.

13. The window apparatus according to claim 1, wherein the movable panel forms a portion of an exterior roof panel of the vehicle comprising a glass portion, wherein the electro-optic device adjusts the transmittance of the glass portion.

14. A method for controlling a dimmable window element for a vehicle, the method comprising:
    adjusting a position of a movable panel in connection with and enclosing an exterior opening of the vehicle;
    positioning a panel module of a connection interface disposed on the movable panel in alignment with a vehicle module of the connection interface based on the adjustment of the position, wherein the connection interface is disposed proximate to a frame portion of the vehicle that forms the exterior opening;
    wirelessly communicating at least one of a control signal and power for the dimmable window via the connection interface; and
    adjusting a transmittance of at least a portion of the movable panel based on the control signal or with the power communicated via the connection interface.

15. The method according to claim 14, further comprising:
    aligning the panel module of the connection interface with the vehicle module by magnetically attracting the panel module and the vehicle module.

16. The method according to claim 14, further comprising:

receiving control instructions from a control module of the vehicle via the connection interface and controlling the transmittance of the electro-optic apparatus responsive to the control signals.

17. The method according to claim 14, further comprising:

receiving an input to a user interface in connection with the movable panel and adjusting the transmittance of the movable panel in response to the input.

18. A window apparatus of a vehicle, the apparatus comprising:

a movable panel that selectively encloses an exterior opening formed by a frame or panel of the vehicle;

a window comprising an electro-optic apparatus formed within the movable panel, wherein the electro-optic apparatus is configured to adjust a transmittance of the window; and a wireless connection interface comprising a first communication module in connection with an interface surface of the movable panel and a second communication module in connection with the frame or panel of the vehicle, wherein the connection interface is disposed in between the movable panel and a header of the vehicle in a closed or latched configuration.

19. The window apparatus according to claim 18, wherein an alignment of the first communication module with the second communication module electrically couples an electrical supply of the vehicle to at least one terminal of the electro-optic element in the closed or latched configuration of the movable panel in connection with the vehicle.

20. The window apparatus according to claim 18, wherein the wireless connection interface communicates at least one of a control signal and power between a plurality of induction coils or capacitive plates disposed in the communication modules.

* * * * *